United States Patent [19]

Hirsenkorn

[11] Patent Number: 5,654,422
[45] Date of Patent: Aug. 5, 1997

[54] ACYLATED γ-CYCLODEXTRINS

[75] Inventor: Rolf Hirsenkorn, Munich, Germany

[73] Assignee: Consortium für elektrochemische Industrie GmbH, Munich, Germany

[21] Appl. No.: 404,536

[22] Filed: Mar. 15, 1995

[30] Foreign Application Priority Data

Apr. 22, 1994 [DE] Germany ............ 44 14 138.6

[51] Int. Cl.$^6$ ............................ C08B 37/16; A01N 43/04
[52] U.S. Cl. ................................................. 536/103
[58] Field of Search ............... 536/103; 514/58, 514/54, 53

[56] References Cited

U.S. PATENT DOCUMENTS

| | | | |
|---|---|---|---|
| 4,764,604 | 8/1988 | Müller | 536/103 |
| 5,017,566 | 5/1991 | Bodor | 536/103 |
| 5,024,998 | 6/1991 | Bodor | 536/103 |
| 5,288,916 | 2/1994 | Lorenz et al. | 536/103 |

FOREIGN PATENT DOCUMENTS

| | | |
|---|---|---|
| 1222697 | 6/1987 | Canada . |
| 0149197 | 3/1990 | European Pat. Off. . |

OTHER PUBLICATIONS

Journal of the American Society, vol. 71, No. 1, Jan. 26, 1949 DC, US, pp. 353–356; D. French et al. "Studies on the Scharclinger Dextrins" p. 355, right col., last para.

Database WPI Week 9407, Derwent Publications Ltd., London, GB AN 053 986 & JP-A 06 009709 (Toppan Printing Co. Ltd.) Jan. 18, 1994 & Patent Abstracts of Japan vol. 18, No. 209 (C-M90), Apr. 13, 1994.

P. Mischnik, New Trends in Cyclodextrins and Derivatives, Dominique Duchene, Chapter 7, "Analysis of the substitution pattern of chemically modified cyclodextrins", Editions des Santes, Paris (1991).

K. Balser et al. "Cellulose Esters", Ullmann's Encyclopedia of Industrial Chemistry, vol. A5, 5th Edition Ed. E. Gerhartz, VCH Verlagsgesellschaft Weinheim 1986, pp. 419–459.

G. Antlsperger, Minutes of the 6th International Symposium on Cyclodextrins, Chicago, 21–24 Apr. 1992, Editions des Santes, Paris, 277 "New Aspects in Cyclodextrin Toxicology".

Zahn–Wellens/EMPA Test, OECD Guideline for Testing of Chemicals 302B, Adopted by the Council on 17th Jul. 1992).

Primary Examiner—John Kight
Assistant Examiner—Louise Leary
Attorney, Agent, or Firm—Collard & Roe, P.C.

[57] ABSTRACT

Acylated cyclodextrins of the formula I:

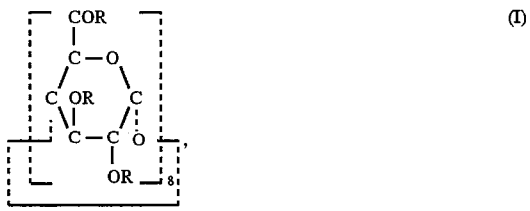

where R denotes hydrogen or R1, and R1 is identical or different and denotes acetyl, propionyl, butyryl, 2-alkoxyacetyl, 2-chloroacetyl, 2-fluoroacetyl, 2-N-acetylaminoacetyl, methacryloyl or acryloyl, and the DS for R1, measured by means of $^1$H NMR spectroscopy, is between 0.3 and 2.0.

8 Claims, No Drawings

ACYLATED γ-CYCLODEXTRINS

BACKGROUND OF THE INVENTION

1. Field of the Invention

The present invention relates to acylated γ-cyclodextrins, to a process for their preparation and to their use.

2. The Prior Art

Cyclodextrins are cyclic oligosaccarides which are assembled from 6, 7 or 8 α(1–4)-linked anhydroglucose units. The α-cyclodextrins, β-cyclodextrins or γ-cyclodextrins prepared by the enzymic conversion of starch differ in the diameter of their cavity. They are generally suitable for enclosing numerous hydrophobic foreign molecules of varying size.

However, with its solubility of 18.7% by weight, native γ-cyclodextrin (γ-CD) is comparatively poorly soluble in water and its capacity for solubilizing is also comparatively low. Thus, for example, U.S. Pat. No. 4,764,604, column 1, last paragraph, columns 7/8 table, discloses that γ-CD only solubilizes in the low range of concentrations and that the complexes frequently precipitate out at higher concentrations. U.S. Pat. No. 4,764,604 also discloses that the solubility and solubilizing properties of γ-CD can be improved by ether formation. It is known that methyl-γ-CD is highly soluble in water and possesses average solubilizing properties. While hydroxypropyl-γ-CD derivatives exhibit good hemolyzing properties, they only have average solubilizing properties. An additional disadvantage of γ-CD ethers such as those mentioned by way of example is that they are difficult to degrade biologically.

SUMMARY OF THE INVENTION

It is an object of the present invention to provide γ-CD derivatives which have better solubilizing properties than do hydroxypropyl-γ-CD derivatives and which at the same time possess good hemolyzing properties, are readily soluble in water and are also readily degradable biologically.

This object is achieved according to the present invention by acylated cyclodextrins of the formula I:

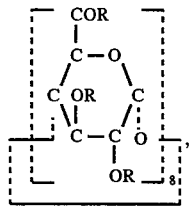
(I)

where R denotes hydrogen or R1, and R1 is identical or different and denotes acetyl, propionyl, butyryl, 2-alkoxyacetyl, 2-chloroacetyl, 2-fluoroacetyl, 2-N-acetylaminoacetyl, methacryloyl or acryloyl, and the DS for R1, measured by means of $^1$H NMR spectroscopy, is between 0.3 and 2.0.

R1 preferably denotes acetyl, propionyl or butyryl in formula I; R1 particularly preferably denotes acetyl in formula I.

The DS for R1 is preferably between 0.4 and 1.6, particularly preferably between 0.6 and 1.4.

The substituent distribution in the cyclodextrin derivatives according to the invention is preferably randomized and the hydroxyl group in position 6 of the glucoses is preferably less than 90%-substituted. It is particularly preferred that the hydroxyl group in position 6 of the glucoses is less than 85%-substituted and in particular less than 80%-substituted.

The γ-cyclodextrin derivatives according to the invention simultaneously exhibit good solubility in water, good solubilizing properties and good hemolyzing properties. In addition, they are biologically degradable and are metabolized by esterases and lipases, that is in nature and also in the gastrointestinal tract, to γ-cyclodextrin, which is known to have favorable toxicological properties (G.Antlsperger, Minutes of the 6th International Symposium on Cyclodextrins, Chicago, 21–24 Apr. 1992, Editions de Sante, Paris, 277).

The cyclodextrin derivatives according to the invention thus combine good product properties with good toxicological properties, with, in particular, the derivatives: having a DS for R1 of between 0.90 and 1.20 being particularly suitable.

Mixtures of acylated cyclodextrins are characterized by their average degree of substitution (DS value). The DS value indicates the number of substituents which are bonded on average per anhydroglucose.

The DS value can, for example, be determined by means of $^1$H NMR spectroscopy in a suitable solvent such as dimethyl sulfoxide/trifluoroacetic acid. In order to determine the DS value, the signals of the acyl groups (int.-ac) and of the sugar protons (int.-su) are integrated, divided, by the number of protons in the acyl substituent or the number of sugar protons, respectively, and then related to each other.

It is also possible to determine the DS from the substituent distribution. On the basis of their structure cyclodextrins can be substituted at the 02, 03 and/or 06 positions. The DS value can be determined, for example, by methylating the products and subsequently hydrolyzing them into the glucose units and converting these, by reduction and acetylation, into the D-glucitol acetates (P. Mischnick, (1991) Analysis of the Substitution Pattern of Chemically Modified Cyclodextrins in Dominique Duchene, New Trends in Cyclodextrins and Derivatives, Editions des Santes, Paris). Fractionation by gas chromatography gives the molar proportions of the total of 8 theoretically possible glucose units, which are listed below, in the particular cyclodextrin derivatives.

| Number of acetoxy groups | Designation | D-glucitol acetate |
|---|---|---|
| 3 | S2, 3, 6 | D-glucitol hexaacetate |
| 2 | S3, 6 | 1,3,4,5,6-penta-O-acetyl-2-mono-O-methyl-D-glucitol |
| 2 | S2, 6 | 1,2,4,5,6-penta-O-acetyl-3-mono-O-methyl-D-glucitol |
| 2 | S2, 3 | 1,2,3,4,5-penta-O-acetyl-6-mono-O-methyl-D-glucitol |
| 1 | S6 | 1,4,5,6-tetra-O-acetyl-2,3-di-O-methyl-D-glucitol |
| 1 | S3 | 1,3,4,5-tetra-O-acetyl-2,6-di-O-methyl-D-glucitol |
| 1 | S2 | 1,2,4,5-tetra-O-acetyl-3,6-di-O-methyl-D-glucitol |
| 0 | S0 | 1,4,5-tri-o-acetyl-2,3,6-tri-o-methyl-D-glucitol |

The average degree of substitution of the individual positions can also be calculated from the measured mol % proportions of the respective glucose units. This average probability X of a substitution in a particular position is calculated as shown below for X6 (average probability of a substitution in the 06 position):

X6=mol % S6+mol % S2,6+mol % S3,6+mol % S2,3,6;

The average degrees of substitution can be calculated in an analogous manner for substitutions in the 02 and 03 positions. The degree of substitution can also be determined by way of the substituent distribution.

The invention furthermore relates to a process for preparing acylated γ-cyclodextrin derivatives wherein γ-cyclodextrin is reacted with at least one acylating agent in the presence of a basic catalyst.

γ-Cyclodextrin of commercially available quality and having a water content of between 0% and 16% by weight can be employed in the process according to the invention. However, the cyclodextrin can also be prepared in a manner known per se, for example by the enzymic conversion of starch using cyclodextrin glycosyl transferase (CGTase E.C.2.4.1.19). For reasons of cost, it is advantageous to use γ-cyclodextrin which has a water content of from about 6% to 12% by weight, as is commercially available (obtainable, for example, under the designation GAMMA W8 from Wacker-Chemie GmbH, Munich).

At least one carboxylic anhydride or one carboxylic acid is preferably employed as the acylating agent. Acetic anhydride, propionic anhydride, butyric anhydride, 2-chloroacetic anhydride, 2-fluoroacetic anhydride, acrylic anhydride, methacrylic anhydride, or the corresponding carboxylic acids, individually or in arbitrary mixture, are particularly preferably employed. Acetic anhydride or acetic acid is used, in particular.

The alkali metal salts of the acids corresponding to the carboxylic anhydrides, for example sodium acetate, potassium acetate, sodium propionate, potassium propionate, sodium butyrate or potassium butyrate, and/or tertiary amines, such as, for example, triethylamine or pyridine, and/or basic ion exchangers (such as those sold under the trademarks AMBERLYST® A21 or AMBERLITE® IRA-93 from Rohm & Haas) are preferably employed as the catalyst. Sodium acetate is particularly preferably employed.

It is possible to carry out the acylation directly in the acylating agent without any additional solvent.

It is advantageous with regard to the coloration of the product if dilution is carried out using at least one inert solvent. The designation solvent does not mean that all the reaction components have to dissolve in this solvent. The reaction can also be carried out in a suspension or emulsion of one or more reagents. The examples of suitable inert solvents are acetic acid, propionic acid, butyric acid, formamide, methylformamide, dimethylformamide, N-methylpyrrolidone, DMPU (1,3-dimethyl-3,4,5,6-tetrahydro-2(1H)-pyrimidinone), acetamide, methylacetamide or dimethylacetamide.

It is particularly advantageous if, when using carboxylic anhydride as the acylating agent, the carboxylic acid corresponding to the acylating agent is employed as solvent for the dilution. Thus, for example, if acetic anhydride is used as the acylating agent, then acetic acid is employed as the solvent.

2–35 mol, preferably 3–20 mol, particularly preferably 5–15 mol, of the acylating agent are preferably employed per mole of γ-cyclodextrin. In this context, the molar ratios which are employed are in each case selected in accordance with the desired degree of substitution and the water content of the cyclodextrin used.

0.01–5 mol, preferably 0.5–3 mol, of at least one of the above catalysts are preferably employed per mole of γ-cyclodextrin.

γ-Cyclodextrin and reaction medium are preferably employed in a ratio of quantity of γ-CD to quantity of reaction medium of from 1:0.5 to 1:10, preferably from about 1:1 to 1:6, with reaction medium being understood to mean the sum, in grams, of acylating agent and solvent. The reaction medium is preferably employed in a form which is largely anhydrous.

In order to prepare the γ- cyclodextrins according to the invention, cyclodextrin, acylating agent, catalyst and reaction medium are added together in the given ratios either simultaneously or in succession. Removal of the water of reaction favors the rate of incorporation of acylating agent.

The acylating agent is preferably added dropwise to the mixture of the remaining components at elevated temperature (from about 80° C. to 120° C.) in order to keep the exothermic reaction under control.

The reaction mixture, which is a suspension as a rule, is stirred at elevated temperature (from about 80° C. to 150° C.). As a rule, the end of the reaction is characterized by clarification of the reaction mixture, when the initial suspension goes into solution.

The working-up is effected by distilling off the volatile components under a partial vacuum, taking up the residue in water, and evaporating this solution once again under a partial vacuum. These procedural steps are preferably repeated several times, for example three times.

The aqueous solution thus obtained, which contains the acylated γ-cyclodextrins according to the invention, can be further purified by means of known processes (for example for removing salts or solvent residues by precipitation methods or dialysis) and dried (for example freeze drying or spray drying).

The process according to the invention is thus a simple process for preparing acylated γ-cyclodextrin derivatives without any elaborate purification steps. It makes it possible to prepare acylated CD directly in only one reaction step by means of reacting native CD with acylating agents in the presence of a catalyst.

The process according to the invention is advantageous because, according to the processes previously used in cellulose chemistry (e.g. K. Blaser et al., "Cellulose Esters" in Ullmanns Encyclopedia of Industrial Chemistry, 5th Edition Ed. E. Gerhartz, VCH Verlagsgesellschaft, Weinheim, 1986, pp. 419–459) highly acylated products are normally prepared initially and then subsequently hydrolyzed until the desired degree of substitution is reached.

The process according to the invention avoids the formation of hydrolysis products by circumventing the hydrolysis step and thereby reduces purification problems.

The process according to the invention can be made flexible and generally useful by simple variation of the acyl donor. The process is economical. It operates catalytically, with readily volatile compounds arising as stoichiometric by-products which can be separated off in a simple manner by distillation. The conversion achieved by the process of the invention is quantitative.

Further purification of the cyclodextrin derivatives is effected, if so desired, by processes which are known per se, such as, for example, by means of precipitation, ion exchange chromatography, dialysis, column chromatography or preparative HPLC.

The cyclodextrin derivatives according to the invention are suitable for all known applications of cyclodextrins and cyclodextrin derivatives.

The cyclodextrin derivatives of the present invention are particularly suitable for, and have the following utility:

for solubilizing poorly water-soluble compounds such as, for example, steroids, as formulation adjuvants, preferably in pharmaceutical, cosmetic and agrochemical products, for stabilizing substances which are sensitive to light, heat or oxidation, for the controlled release of pharmaceutical active compounds, agrochemical active compounds, such as insecticides or fungicides, and scents, in particular for cosmetics or the household, for defatting and cleaning any surfaces whatever, for replacing organic solvents, particularly in the separation and extraction of substances from lipophilic media, as auxiliary substances, in particular in coating and/or adhesive lamination in the paper, leather and textile industries, for modifying rheology, as phase-transfer catalysts, and also for masking tastes and odors.

Acetyl-γ-cyclodextrins, in particular, are outstandingly suitable for use in pharmaceutical applications. For example, they are suitable for solubilizing pharmaceutical active compounds such as, for example, steroids, alkaloids, vitamins, anti-rheumatic compounds, cardiac glycosides or psychopharmaceuticals such as, for example, tranquilizers or neuroleptic agents.

Other objects and features of the present invention will become apparent from the following detailed description considered in connection with the accompanying examples which discloses several embodiments of the present invention. It should be understood, however, that the examples are designed for the purpose of illustration only and not as a definition of the limits of the invention.

The course of the reactions described in the examples was monitored by means of thin layer chromatography. Prior to the thin layer chromatography, the substances have to be isolated, for example by precipitation with acetone. The DS values mentioned in the examples were determined by means of $^1$H NMR spectroscopy (solvent, dimethyl sulfoxide/trifluoroacetic acid).

DETAILED DESCRIPTION OF PREFERRED EMBODIMENTS

EXAMPLE 1

Preparation of Acetyl-γCD (DS, 1.17)

200 g (135.4 mmol) of γ-CD (12.2% water) and 20 g (244.3 mmol) of sodium acetate were suspended in 282 ml of acetic acid and this suspension was heated to 105° C. 141 g (1382 mmol) of acetic anhydride were slowly added dropwise, over a period of about one hour, to the thoroughly stirred suspension. During this procedure, the temperature of the mixture rose to the reflux temperature (117° C.). The mixture was subsequently boiled under reflux, during which period the reaction mixture slowly went into solution. The reaction was complete after about 13 h. The mixture cooled down to room temperature.

50 ml of water were added dropwise to the reaction mixture. The acetic acid was largely removed by rotary evaporation. (Temperature equals 80° C., 100 mm Hg). The product was then dissolved in 200 ml of water and subjected to rotary evaporation. This step was carried out 3 times in all. Finally, the product was dissolved in 400 g of water. The product thus obtained had a DS of 1.17.

EXAMPLE 2

Preparation of Acetyl-γ-CD (DS, 0.83)

100 g (67.7 mmol) of γ-CD (12.2% water), 45 g (441 mmol) of acetic anhydride, 220 ml of acetic acid and 10 g (122.1 mmol) of sodium acetate were reacted as described in Example 1. The reaction was complete after about 14 h. Further working-up was carried out as described in Example 1. The product had a DS of 0.83.

EXAMPLE 3

Preparation of Acetyl-γ-CD (DS,0.95)

200 g (135.4 mmol) of γ-CD (12.4% water), 130 g (1274 mmol) of acetic anhydride, 382 ml of acetic acid and 20 g (244.3 mmol) of sodium acetate were reacted as described in Example 1. The reaction was complete after about 16 h. Further working-up was carried out as described in Example 1. The product had a DS of 0.95.

EXAMPLE 4

Preparation of Further Acetyl-γ-CD Derivatives

Acetyl-γCD derivatives having DS values of 1.11, 1.00, 1.36 and 0.90 were prepared as described in Example 1.

(DS 1:11: 100 g (72.5 mmol) of γ-CD (water content 6%), 52.1 g (511 mmol) of acetic anhydride, 180 ml of acetic acid and 6 g (73 mmol) of sodium acetate; 117° C.; 24 h).

(DS 1.00: 200 g (134.1 mmol) of γ-CD (13% water), 82.1 g (800 mmol) of acetic anhydride, 382 ml of acetic acid and 20 g (243 mmol) of sodium acetate; 105° C.; 20 h).

(DS 1.36: 200 g (134.1 mmol) of γ-CD (13% water), 191.6 g (1880 mmol) of acetic anhydride, 382 ml of acetic acid and 20 g (243 mmol) of sodium acetate; 117° C.; 16 h).

(DS 0.90: 100 g (67.1 mmol of γ-CD, 55.5 g (544 mmol) of acetic anhydride, 200 ml of acetic acid and 10 g (122 mmol) of sodium acetate; 117°C.; 20 h).

EXAMPLE 5

Preparation of Acetyl-γ-CD (DS, 0.95)

100 g (73.08 mmol) of γCD (5.2% water), and 15 g (244.3 mmol) of sodium acetate were suspended in 350 ml of acetic acid and the mixture was heated to a temperature of 117° C. (reflux temperature). The mixture was boiled under reflux, during which period the reaction mixture slowly went into solution (approximately 18.5 h). The reaction mixture was boiled for a further 1 h after it had clarified. The mixture was then cooled down to room temperature.

The acetic acid was to a large extent removed by rotary evaporation (Temperature equal to 80° C., 100 mm Hg). The product was dissolved in 200 ml of water and subjected to rotary evaporation. This process was carried out three times in all. Finally, the product was dissolved in 400 g of water. The product thus obtained had a DS of 0.95.

EXAMPLE 6

Preparation of Propionyl-γ-CD (DS, 0.85)

100 g (67.7 mmol) of γ-CD (12.3% water), 109.7 g (843 mmol) of propionic anhydride, 6 g (73.8 mmol) of sodium acetate and 100 ml of propionic acid were reacted utilizing a procedure analogous to that described in Example 1 and then worked up. The reaction temperature was 140° C. and the reaction time was 15 h.

The product thus obtained had a DS of 0.85.

EXAMPLE 7

Determination of the Substituent Distribution in the Products Prepared in Accordance with EXAMPLES 1 to 5

5 mg of each of the samples according to EXAMPLES 1 to 5 were in each case weighed into a 4 ml reaction vessel sold under the trademark REACTI-VIAL®, manufactured by Pierce, Post Office Box 117, Rockford, Ill., 61105, U.S.; and 1 ml of trimethyl phosphate was pipetted in. If appropriate, the mixture was dissolved for a short period in an ultrasonic bath.

100 µl of methyl trifluoromethanesulfonate and 150 µl 2,6-di-tert-butylpyridine were then added and the vessel was provided with a stirrer and was sealed well. The mixture was then left to react for 2 hours in the vessel, which was placed in a water bath at 50° C. This mixture was washed quantitatively into a 50 ml separating funnel using 20 ml of double-distilled water and then extracted once by shaking thoroughly with 5 ml of chloroform.

The lowest layer was drained into a reaction vessel sold under the trademark REACTI-VIAL® and evaporated to dryness at room temperature using $N_2$ gas.

Hydrolysis

The vessel containing the sample from the methylation step was filled with trifluoroacetic acid up to the 4 ml mark, sealed and heated at 110° C. for 4 hours. It was then cooled down to about 60° C. and the trifluoroacetic acid blown off with nitrogen (to dryness). The residue was treated 3 times with approximately 25 ml of dichloromethane, which was blown off with nitrogen on each occasion.

Reduction 0.25 ml of 0.5M solution of Na-borohydride in $NH_4OH$ was added to the hydrolysis residue and the mixture was heated at 60° C. for at least one hour. After cooling down, the excess reagent was destroyed by adding glacial acetic acid until there was no further evolution of gas on shaking. The borate was removed as methyl borate by repeatedly adding methanol containing approximately 2% acetic acid and then blowing it off with nitrogen. The vessel was filled 6 times up to the 4 ml mark and the mixture then concentrated (almost) to dryness on each occasion.

Acetylation

After cooling, 25 µl of pyridine and 200 µl of acetic anhydride were added. The reaction vessel sold under the trademark REACTI-VIAL® was sealed and placed in a drying oven at 100° C. for 3 h.

After cooling, approximately 1–2 ml of a saturated solution of sodium hydrogen carbonate was added carefully and the vessel was rapidly sealed. 1 ml of $CHCl_3$ and a small volume of $NaHCO_3$ solution were added to a second reaction vessel. The solution from the first vessel was carefully poured into the second vessel, which was sealed, shaken to a certain extent, aerated and then shaken well. The aqueous phase was pipetted off and discarded. The first vessel was rinsed out twice and in this way the process of extracting by shaking was repeated approximately 3 times. $CaCl_2$ was added to the chloroform which had been purified in this way, as was, where appropriate, a small additional volume of $CHCl_3$ as well, and the solution was taken out using a glass tip in order to be able to pipette it into a small glass test tube. The GC analysis was then carried out.

The substituent distribution is given in Table 1.

TABLE 1

| Substituent distribution AC-γ-CD | | S0 | S3 | S2 | S6 |
|---|---|---|---|---|---|
| EXAMPLE 2 | AC-γ-CD(0.83) | 26.45% | 3.45% | 0.75% | 57.55% |
| EXAMPLE 4 | AC-γ-CD(0.90) | 19.65% | 3.70% | 0.75% | 60.70% |
| EXAMPLE 1 | AC-γ-CD(1.17) | 14.95% | 2.85% | 2.30% | 57.45% |

TABLE 1-continued

| Substituent distribution AC-γ-CD | | | | | |
|---|---|---|---|---|---|
| EXAMPLE 3 | AC-γ-CD(0.95) | 23.75% | 2.65% | 2.25% | 55.00% |
| EXAMPLE 4 | AC-γ-CD(1.11) | 15.40% | 3.00% | 2.90% | 49.05% |
| EXAMPLE 4 | AC-γ-CD(1.0) | 19.45% | 3.05% | 2.75% | 50.70% |
| EXAMPLE 4 | AC-γ-CD(1.36) | 13.65% | 3.35% | 3.00% | 38.50% |
| EXAMPLE 5 | AC-γ-CD(0.95) | 23.70% | 2.70% | 2.20% | 56.40% |
| | | S2.3 | S3.6 | S2.6 | S2.3.6 |
| EXAMPLE 2 | AC-γ-CD(0.83) | 1.00% | 7.35% | 2.00% | 1.35% |
| EXAMPLE 4 | AC-γ-CD(0.90) | 1.10% | 9.55% | 2.20% | 2.35% |
| EXAMPLE 1 | AC-γ-CD(1.17) | 0.90% | 10.40% | 8.45% | 2.60% |
| EXAMPLE 3 | AC-γ-CD(0.95) | 0.65% | 7.50% | 6.35% | 1.85% |
| EXAMPLE 4 | AC-γ-CD(1.11) | 1.05% | 11.80% | 11.60% | 5.15% |
| EXAMPLE 4 | AC-γ-CD(1.0) | 1.15% | 10.00% | 9.25% | 3.80% |
| EXAMPLE 4 | AC-γ-CD(1.36) | 2.00% | 15.05% | 13.45% | 10.95% |
| EXAMPLE 5 | AC-γ-CD(0.95) | 0.70% | 7.00% | 6.10% | 1.40% |
| | | X2 | X3 | X2.3 | X6 |
| EXAMPLE 2 | AC-γ-CD(0.83) | 5.10% | 13.15% | 18.25% | 68.25% |
| EXAMPLE 4 | AC-γ-CD(0.90) | 6.40% | 16.70% | 23.10% | 74.80% |
| EXAMPLE 1 | AC-γ-CD(1.17) | 14.25% | 16.75% | 31.00% | 78.90% |
| EXAMPLE 3 | AC-γ-CD(0.95) | 11.10% | 12.65% | 23.75% | 70.70% |
| EXAMPLE 4 | AC-γ-CD(1.11) | 20.70% | 21.00% | 41.70% | 77.60% |
| EXAMPLE 4 | AC-γ-CD(1.0) | 16.95% | 18.00% | 34.95% | 73.75% |
| EXAMPLE 4 | AC-γ-CD(1.36) | 29.40% | 31.35% | 60.75% | 77.95% |
| EXAMPLE 5 | AC-γ-CD(0.95) | 10.40% | 11.80% | 22.20% | 70.90% |

EXAMPLE 8

Determination of Different Properties of the Products Prepared in Accordance with EXAMPLES 1 to 5, and a Comparison with Products of the State of the Art Measurements were made of the water solubility, the solubilizing capacity, the hemolytic activity, the enzymic degradability and the biological degradability of the products. Methyl-γ-cyclodextrin (DS,1.8) (Me-gamma CD) and two hydroxypropyl-γ-cyclodextrin derivatives (DS, 0.9; DS, 0.6) (Hp-gamma-CD) were used as products which represented the state of the art.

The water solubility was determined at 25° C.

To determine the capacity for solubilizing hydrocortisone, 30% aqueous solutions of the cyclodextrin derivatives were prepared and shaken at 25° C. for 24 h with an excess of hydrocortisone. Undissolved inclusion product was separated off by filtration using a membrane filter (0.2 µm). The concentration of hydrocortisone in the filtrate was determined by means of HPLC.

In order to determine the capacity for solubilizing cholesterol, 40 mg of cholesterol were in each case added to 1 ml of the 30% aqueous solutions of the cyclodextrin derivatives and the mixtures were shaken overnight. The precipitate was then centrifuged off.

The following solutions were prepared for the cholesterol determination:

a) Buffer Solution 1.21 g of Tris-buffer, 430 mg of the sodium salt of cholic acid and 100 mg of ABTS were dissolved in approximately 80 ml of deionized water and adjusted to pH 7.7 using 1M HCl. 1.02 g of $MgCl_2.6\ H_2O$ 40 U of peroxidase were added and the pH was corrected to pH 7.7 using 0.1M HCl. The volume was made up to 100 ml in the volumetric flask using deionized water.

b) Cholesterol Oxidase Solution 15,000 U of cholesterol oxidase (Sigma (815) (E.C.1.1.3.6)) were added to 1000 ml of 1M $(NH_4)_2SO_4$.

For determining the cholesterol, 50 μl of the sample solution, 3 ml of buffer solution and 20 μl of cholesterol oxidase solution were pipetted into a test tube, which was sealed with parafilm and shaken to mix the reagents thoroughly; the tube was then incubated at 37°–40° C. for 1 h in a water bath. Once the solution has been diluted appropriately, its cholesterol content is determined photometrically (730 nm).

The hemolytic activity was determined as described in EP-B-0149197.

The enzymic degradability was measured using the following mixture.

2.5 ml of 0.1M Tris buffer, 22.5 ml of water, 10 microliters of acetonitrile, 200 microliters of a solution of acetyl-gamma-CD (500 mg/ml), and 100 units of enzyme.

The biological degradability was determined by means of the Zahn-Wellens Test (OECD Guidelines for testing of Chemicals 302B, Adopted by the Council on 17th Jul. 1992).

The water solubility, the solubilization results, the results of the Zahn-Wellens Test (ZaWe-14d) and also the hemolysis results are listed in Table 2.

where R denotes hydrogen and R1, and

R1 is identical or different and denotes acetyl, propionyl, butyryl, 2-alkoxyacetyl, 2-chloroacetyl, 2-fluoroacetyl, 2-N-acetylaminoacetyl, methacryloyl or acryloyl, and the DS for R1, measured by means of $^1$H NMR spectroscopy, is between 0.3 and 2.0, such that the cyclodextrin of formula I is partially acylated.

2. The acylated cyclodextrin derivative as claimed in claim 1, wherein R1 denotes acetyl, propionyl or butyryl in formula I, wherein the DS for R1 is between 0.4 and 1.6.

3. The acylated cyclodextrin derivative as claimed in claim 1, wherein R1 denotes acetyl in formula I and the DS is between 0.6 and 1.4.

4. The acylated cyclodextrin derivative as claimed in claim 1, wherein there is a substituent distribution which is randomized and the hydroxyl group in position 6 of the glucoses is less than 90% substituted.

5. The acylated cyclodextrin derivative as claimed in claim 4, wherein the hydroxyl group in position 6 of the glucoses is less than 85% substituted.

TABLE 2

Comparison of gamma-derivatives

|  |  | Water Solubility | Solubilization of Hydrocortisone [mg/ml] | Solubilization of cholesterol [mg/ml] | Degradation ZaWe-14d | Hemolysis, 50% at CD conc. |
|---|---|---|---|---|---|---|
| Ex. 2 | Ac-gamma-CD(0.83) | 50.00% | 46.6 | 1.09 | 98% | 3.7% |
| Ex. 4 | Ac-gamma-CD(0.87) | 24.50% | 53.7 | 0.44 |  | 3.7% |
| Ex. 4 | Ac-gamma-CD(0.90) | 29.90% | 52.7 | 0.90 | 98% | 6.0% |
| Ex. 3 | Ac-gamma-CD(0.95) | >70% | 52.5 | 0.70 |  |  |
| Ex. 4 | Ac-gamma-CD(1.0) | >68% | 52.4 |  |  |  |
| Ex. 4 | Ac-gamma-CD(1.11) | >70% | 50.2 | 0.37 |  | 9.1% |
| Ex. 1 | Ac-gamma-CD(1.17) | >70% | 49.5 | 0.30 |  | 8.6% |
| Ex. 4 | Ac-gamma-CD(1.36) | >68% | 39.6 | 0.13 |  | 16.0% |
| Ex. 5 | Ac-gamma-CD(0.95) | >70% | 53.4 |  |  |  |
|  | Hp-gamma-CD(0.9) |  | 28 | 0.04 | 25% | >30% |
|  | Hp-gamma-CD(0.6) |  | 41 | 0.10 |  | >30% |
|  | Me-gamma-CD(1.8) |  | 39.6 |  | 14% | 14.9% |

AC-γ-CD can be degraded by the following enzymes:

lipolase 100 L (Novo Industri, Copenhagen)

lipase, pancreatic (EC 3.1.1.3), from Sigma Chem. Company esterase, from pig liver, from Boehringer Mannheim lipase from Aspergillus niger, EC 3.1.1.3, Fluka While several embodiments of the present invention have been shown and described, it is to be understood that many changes and modifications may be made thereunto without departing from the spirit and scope of the invention as defined in the appended claims.

What is claimed is:

1. A partially acylated cyclodextrin of formula I:

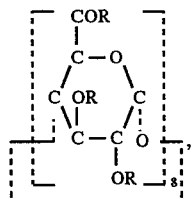

6. A process for preparing acylated γ-cyclodextrin derivatives, comprising reacting γ-cyclodextrin with at least one acylating agent in the presence of a basic catalyst; and recovering said acylated γ-cyclodextrin derivative.

7. The process as claimed in claim 6, comprising said acylating agent being selected from the group consisting of acetic anhydride, propionic anhydride, butyric anhydride, 2-chloroacetic anhydride, 2-fluoroacetic anhydride, acrylic anhydride or methacrylic anhydride, and the corresponding carboxylic acids, individually or in arbitrary mixture.

8. In a process for preparing pharmaceutical compositions containing an acylated cyclodextrin of formula I according to claim 1, the improvement comprises utilizing acetyl-γ-cyclodextrin as said acylated cyclodextrin.

* * * * *